April 1, 1947. J. P. MAXFIELD 2,418,132
ELECTROMECHANICAL SIGNAL TRANSLATING DEVICE
Filed April 12, 1944
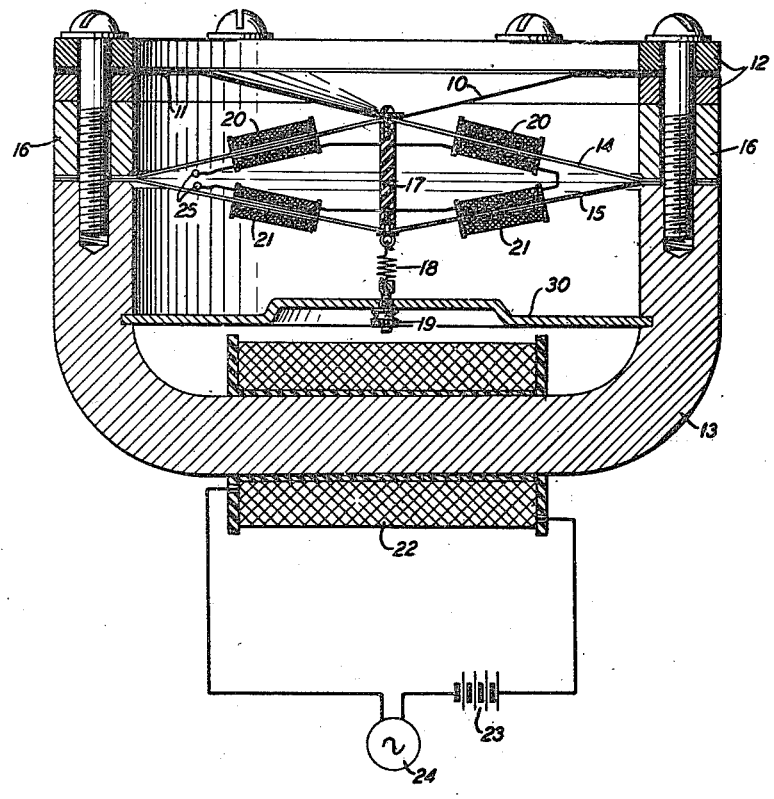
INVENTOR
J. P. MAXFIELD
BY
Walter E. Kiesel
ATTORNEY Patented Apr. 1, 1947

2,418,132

UNITED STATES PATENT OFFICE 2,418,132

ELECTROMECHANICAL SIGNAL TRANSLATING DEVICE

Joseph P. Maxfield, Madison, N. J., assignor to Bell Telephone Laboratories, Incorporated, New York, N. Y., a corporation of New York Application April 12, 1944, Serial No. 530,709

12 Claims. (Cl. 177—352)

This invention relates to electromechanical signal translating devices and more particularly to microphones especially suitable for the detection and measurement of compressional waves of low frequency, such as, for example, explosive waves encountered in sound ranging gun locating systems.

One object of this invention is to improve the sensitivity of signal translating devices especially suitable for the detection of low frequency compressional waves or vibrations.

Another object of this invention is to enable the attainment from a microphone of an output or signal voltage proportional to the pressure intensity of and substantially independent of the time rate of change of the instantaneous pressure of incident waves, whereby the operating range of the microphone extends down to zero frequency.

A further object of this invention is to improve the operating efficiency of electromagnetic signal translating devices.

In one illustrative embodiment of this invention, a microphone especially suitable for use in sound ranging, gun locating systems comprises a freely vibratile diaphragm and an electromagnetic circuit including a magnetostrictive element coupled to the diaphragm in such manner that the reluctance thereof varies in accordance with vibrations of the diaphragm. The circuit includes also means for establishing a high frequency flux therein and coils electromagnetically associated with the magnetostrictive element.

In accordance with one feature of this invention, the magnetostrictive element comprises two similar portions correlated with each other and the diaphragm so that the stresses in the two portions are varied in opposite sense in accordance with displacement of the diaphragm and signal coils are associated with the two portions and poled in opposition. In accordance with another feature of this invention, means are provided for adjusting the initial stresses in the two portions of the magnetostrictive element to establish a prescribed unbalance between the initial stresses in the two portions whereby excess high frequency components in the system are substantially reduced. In a particularly advantageous device, the initial stresses in the two portions are unbalanced to an extent slightly greater than that corresponding to the diaphragm displacement for the maximum pressure intensity of the waves to be translated by the device, whereby high percentage modulation, substantially 100 per cent modulation for waves of the maximum intensity, is realized.

When the diaphragm is at rest, because of the unbalance of the two portions of the magnetostrictive element, the voltage at the output terminals is a high frequency voltage of prescribed amplitude. When the diaphragm vibrates, at any instant the variations in the stresses in the two portions of the magnetostrictive element are of opposite sense, that is, the stress in one portion increases while that in the other decreases. Consequently, the reluctances of the two portions vary in opposite sense and the voltages in the associated coils likewise vary in opposite sense. Inasmuch as the coils are oppositely poled, the total voltage thereacross is the sum of the changes in the individual coils plus the fixed voltage due to the initial unbalance and, therefore, the output signal obtained from the coils is a high frequency voltage amplitude modulated in accordance with the displacement of the diaphragm. In a construction wherein the initial unbalance is of the extent noted heretofore, for the maximum diaphragm displacement the output voltage of the microphone varies between substantially zero and substantially twice the amplitude of the high frequency voltage due to the initial unbalance. It will be seen that because of the extent of the initial unbalance, in the intended operating signal or wave intensity range for the device, the output voltage may approach but does not fall completely to zero.

The invention and the above-noted and other features thereof will be understood more clearly and fully from the following detailed description with reference to the accompanying drawing in which the single figure is in part a side view in section of a microphone illustrative of one embodiment of this invention and in part a diagram showing a typical manner of energizing the magnetic circuit.

Referring now to the drawing, the microphone illustrated comprises a non-magnetic diaphragm having a rigid, bodily vibratile portion 10, for example conical as shown, an annular flexible portion 11 and a peripheral portion which is secured between annular, non-magnetic clamping members 12. Operatively associated with the diaphragm is an electromagnetic system which includes a U-shaped magnetic yoke 13 of relatively low reluctance and a pair of magnetostrictive members 14 and 15 of relatively high reluctance bridged in parallel, magnetically across the ends of the yoke 13. The magnetostrictive members 14 and 15 may be, for example, thin strips of a nickel-iron alloy such as "Permalloy" having their ends clamped to the ends of the yoke by magnetic blocks 16.

The magnetostrictive strips are bowed in opposite directions and stressed to the point of optimum magnetostrictive action as by a rigid non-magnetic spacer 17 secured to the centers or apices of the strips. A spring 18 is connected to the center of the strip 15 and is adjustable, as by a screw 19 mounted on a bridge piece 30 supported by the yoke 13 to establish the initial unbalance between the two strips. Each strip 14 and 15 is encompassed by a pair of coils 20 and 21 respectively, the coils of each pair being connected in series aiding relation and the two pairs being substantially identical electrically and connected in series opposition for reasons set forth hereinafter. As illustrated in the drawing, the internal diameter of each coil is sufficiently large to allow free movement of the magnetostrictive strips. The coils may be mounted rigidly by suitable supports, not shown.

The yoke 13 has coupled thereto an energizing coil 22 which, in operation of the device, is connected in circuit with a direct current source 23, such as a battery and a high frequency source 24, such as an oscillator having a low resistance to the flow of direct current. The source 23 energizes the coil 22 to establish a suitable direct current polarizing flux in the magnetic circuit composed of the yoke 13 and the magnetostrictive strips 14 and 15; the source 24 energizes the coil 22 to establish in the circuit a varying component of flux, for example of 1,000 cycles per second frequency, superimposed upon the polarizing flux.

When the diaphragm is stationary, because of the varying component of the flux threading the strips 14 and 15, unequal high frequency voltages are induced in the pairs of coils 20 and 21. Inasmuch as these coil pairs are connected in series opposition, as noted heretofore, when the diaphragm is at rest the voltage appearing across the output terminals 25 is the high frequency voltage to be modulated by the action of the signal wave. When the diaphragm 10, 11 vibrates, as in response to compressional waves incident thereon, the initial magnetic unbalance between the strips 14 and 15 is varied in accordance with the amplitude of the diaphragm displacement. That is to say, when the diaphragm vibrates the tension of the two strips 14 and 15 is varied in opposite sense so that, because of the magnetostrictive character of the strips, the reluctance of one strip increases while that of the other decreases. The sign of the reluctance change in each strip at any instant will be determined, of course, by the direction of the diaphragm motion. These changes in reluctance result in corresponding changes in the flux threading the two strips so that the voltages induced in the signal coils 20 and 21 vary in like manner, the voltage in one pair of coils increasing while that in the other pair decreases. When the diaphragm motion tends to bring the strips into equal tension the high frequency voltage is lowered and when the diaphragm motion is in the direction to increase the unbalance the high frequency voltage is increased. Consequently, a high frequency voltage, amplitude modulated in accordance with the diaphragm vibrations, is obtained at the terminals 25.

Inasmuch as the variation in reluctance of the magnetostrictive strips 14 and 15 is proportional to the changes in the tension of the strips and the tension changes are proportional, in turn, to the amplitude of the diaphragm motion, it will be appreciated that the modulation of the output voltage at the terminals 25 is proportional to the diaphragm displacement and substantially independent of the rate of change of diaphragm displacement commonly called diaphragm velocity. Consequently, the microphone is operable down to zero frequency and constitutes an efficient and sensitive detector of waves or vibrations of extremely low frequency.

Although in the device disclosed the direct current polarizing flux is obtained by energization of the coil 22 from the source 23, it may be obtained from a permanent magnet, for example, a bar magnet bridged across the arms of the yoke 13.

It will be understood, of course, that the specific embodiment of this invention shown and described is but illustrative and that various modifications may be made therein without departing from the scope and spirit of this invention as defined in the appended claims.

What is claimed is:

1. An electromechanical signal translating device comprising a magnetic circuit including a pair of similar magnetostrictive branches magnetically in parallel, means for establishing a varying flux in said circuit and threading said branches, signal coils magnetically coupled to said branches and poled in opposing relation, and vibratile means for varying the reluctance of said branches in opposite sense in accordance with vibration of said vibratile means.

2. An electromechanical signal translating device comprising a magnetic circuit including a pair of similar tensioned magnetostrictive strips magnetically in parallel, a pair of signal coils each magnetically coupled to a corresponding one of said strips, said coils being connected in series opposition, means for establishing a high frequency flux threading said strips, and means for varying the tension of said strips in opposite sense in accordance with signal vibrations.

3. An electromagnetic signal translating device comprising an electromagnetic circuit including a pair of branches in parallel and normally unbalanced to a prescribed extent, each of said branches including a magnetostrictive member and a signal coil magnetically coupled thereto, the two signal coils being connected in opposing relation, means for establishing a high frequency flux threading said strips, and means for varying the unbalance of said branches in accordance with signal vibrations.

4. An electromagnetic signal translating device comprising an electromagnetic circuit including a pair of branches in parallel, each of said branches including a magnetostrictive member and a signal coil magnetically coupled thereto, the two coils being connected in opposition and the two magnetostrictive elements being similar, means for establishing a varying flux threading said elements, means for mounting said elements to produce an unbalance between the varying flux in the two elements, and means for varying the reluctance of said pair of branches in opposite sense in accordance with signal vibrations.

5. An electromechanical signal translating device comprising a magnetic circuit including a pair of similar magnetostrictive strips magnetically in parallel, a pair of similar signal coils each magnetically coupled to a corresponding one of said strips, said coils being connected in series opposition, means for establishing a high frequency flux threading said strips, means for establishing unequal initial tensions in said strips to produce an unbalance between the high frequency fluxes in the two strips, and means for varying the tension of the two strips in opposite sense in accordance with signal vibrations.

6. An electromechanical signal translating device comprising a magnetic circuit including a pair of magnetostrictive members magnetically in parallel, said members being fixed at their ends and bowed in opposite directions, means for establishing a high frequency flux threading said members, a pair of signal coils each magnetically coupled to a corresponding one of said members, said coils being connected in opposing relation, and signal responsive vibratile means for varying the tension of said members simultaneously and in opposite sense.

7. An electromechanical signal translating device comprising a pair of similar magnetostrictive strips fixed at their ends, mounted in juxtaposition and bowed in opposite directions, means for establishing a high frequency flux threading said strips in the same longitudinal direction, a pair of signal coils each coupled magnetically to a corresponding one of said strips, said coils being connected in series opposition, and means for varying the tension of said strips simultaneously and in opposite sense comprising diaphragm means for vibrating said strips simultaneously, normal to the length thereof and in the same direction.

8. An electromechanical signal translating device comprising a pair of juxtaposed, V-shaped magnetostrictive strips having their apices pointing in opposite directions, means fixing the ends of said strips, rigid spacer means connecting the apices of said strips, a vibratile diaphragm connected to said strips, means for establishing a high frequency flux threading said strips longitudinally, and a pair of signal coils each coupled magnetically to a corresponding one of said strips, said coils being poled in opposing relation.

9. An electromechanical signal translating device in accordance with claim 8 comprising means for establishing an unbalance between the normal tensions of said strips.

10. An electromechanical signal translating device in accordance with claim 8 comprising a spring coupled to said strips, and means for adjusting the tension of said spring.

11. An electromechanical signal translating device comprising a magnetic circuit including a U-shaped yoke and a pair of similar, juxtaposed magnetostrictive strips bridged across the ends of said yoke, said strips being tensioned to bow in opposite directions, rigid means connecting said strips intermediate the ends thereof, a diaphragm connected to one of said strips and vibratile in the direction normal to the length of said one strip, an energizing coil coupled to said yoke, a high frequency source connected to said coil, and a pair of signal coils each coupled magnetically to a corresponding one of said strips, said signal coils being connected in series opposition.

12. An electromechanical signal translating device comprising a pair of similar magnetostrictive strips mounted in juxtaposed relation and fixed at their ends, means for bowing said strips in opposite directions including a rigid member connecting said strips at points intermediate the ends thereof, a signal responsive vibratile member coupled to said rigid member, resilient means coupled to said rigid member for displacing said points of said strips in the same direction a distance substantially equal to the maximum displacement of said vibratile member in response to signals, whereby an unbalance of prescribed extent between the normal tensions of said strips is established, means for establishing substantially equal polarizing fluxes in said strips, means for superimposing high frequency fluxes upon said polarizing fluxes, and a pair of signal coils connected in series opposition, each coil being coupled magnetically to a corresponding one of said strips.

JOSEPH P. MAXFIELD.

REFERENCES CITED

The following references are of record in the file of this patent:

UNITED STATES PATENTS

| Number | Name | Date |
| --- | --- | --- |
| 2,347,584 | Villem | Apr. 25, 1944 |
| 2,249,835 | Lakatos | July 22, 1941 |
| 2,311,079 | Parr | Feb. 16, 1943 |

FOREIGN PATENTS

| Number | Country | Date |
| --- | --- | --- |
| 590,783 | German | Jan 10, 1934 |
| 2,578 | British | May 31, 1882 |